A. F. WASHBURN.
APPARATUS FOR SHARPENING LAWN MOWERS.
APPLICATION FILED JAN. 10, 1916.
1,199,949.
Patented Oct. 3, 1916.
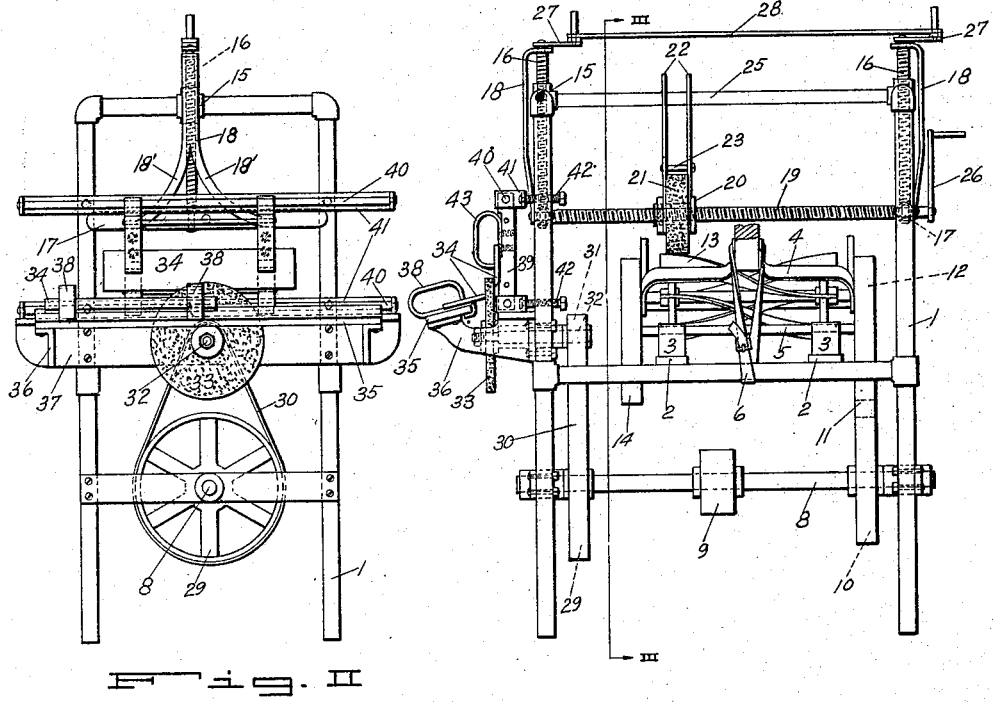
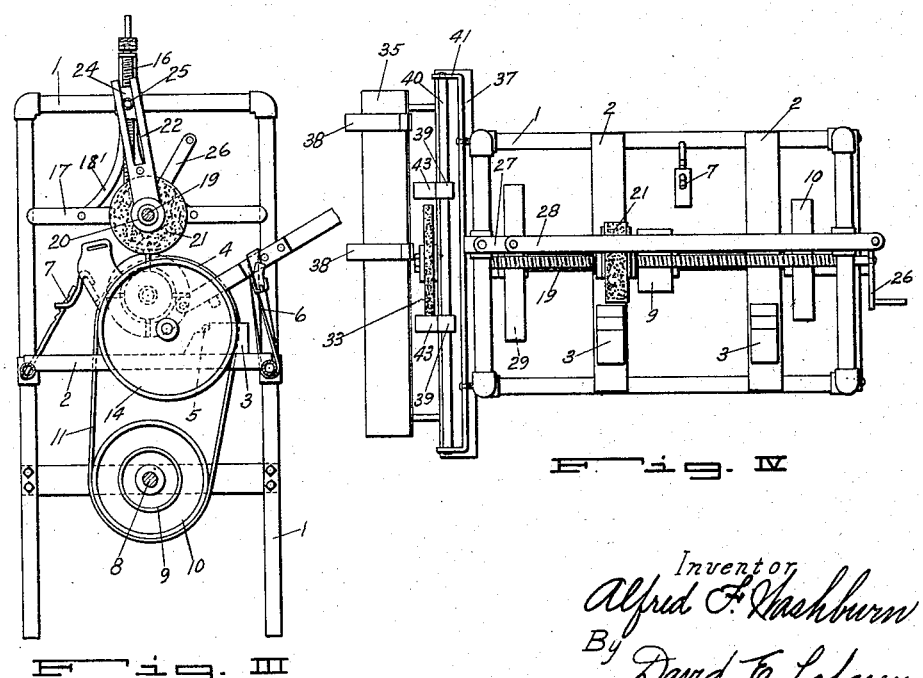
Inventor
Alfred F. Washburn
By David E. Lofgren
Attorney.

UNITED STATES PATENT OFFICE.

ALFRED F. WASHBURN, OF PORTLAND, OREGON, ASSIGNOR OF ONE-HALF TO FERNANDO E. EPTON, OF PORTLAND, OREGON.

APPARATUS FOR SHARPENING LAWN-MOWERS.

1,199,949.  Specification of Letters Patent.  Patented Oct. 3, 1916.

Application filed January 10, 1916. Serial No. 71,363.

*To all whom it may concern:*

Be it known that I, ALFRED F. WASHBURN, a citizen of the United States, residing at Portland, in the county of Multnomah and State of Oregon, have invented new and useful Improvements in Apparatus for Sharpening Lawn-Mowers, of which the following is a specification.

My invention relates to an apparatus for sharpening a lawn mower and has as its principal object the provision of a simple but practical and efficient apparatus for the purpose mentioned, and one which may be operated by unskilled labor.

A further object of my invention resides in the particular arrangement and combination of parts hereinafter described.

In the accompanying drawings: Figure I is a front elevation of an apparatus embodying my invention. Fig. II is an end elevation taken from the left of Fig. I. Fig. III is a sectional elevation taken on the line III—III and looking in the direction of the arrows. Fig. IV is a top plan view with the mower and shear blades removed.

Referring more particularly to the drawings, 1 is a framework of generally rectangular outline and which is preferably formed of standard sized pipe and standard fittings. On the frame 1 are two horizontal cross pieces such as 2 on which are carried blocks such as 3 for supporting the lawn mower after the same has been inserted, the lawn mower being designated in general by the reference character 4. When a cross piece such as 5 of the lawn mower has been placed upon the blocks 3—3 the mower is fastened in place by means of a stop such as 6 fastened around the handle bar and a hook such as 7 which clamps the cross piece on which the shear knife is ordinarily carried, the said stop 6 and hook or clamp 7 being secured to the frame 1 to hold the lawn mower from tilting on the blocks 3.

Journaled in the lower part of the frame 1 is a shaft 8 on which is a driving pulley 9. At the right hand end of the shaft 8 as viewed in Fig. 1 is a pulley 10 over which runs a belt 11, the other end of the belt running over one of the usual driving wheels 12 of the lawn mower in order to turn the blades 13 of the frame when the lawn mower 4 is held on the blocks 3. The belt 11, however, is driven in such direction that the blades 13 are turned backward during the sharpening operation. At the other end of the lawn mower from the wheel 12 is the usual complemental driving wheel 14, the wheel 14 being idle during the sharpening operation.

The upper end of the frame 1 carries at each end a solid core such as 15 through which extends a long screw such as 16, the lower ends of the screw 16 being guided in the vertically movable cross pieces such as 17, the ends of the pieces 17 being guided by the sides of the frame 1. In order to steady the pieces 17 I provide also two bars such as 18, the upper end of which is bent horizontal and apertured to fit over the upper and solid end of one of the screws 16. The long end of each bar 18 is branched as indicated at 18' and the ends of the branches fastened to the corresponding cross piece 17. As is shown clearly in the drawing the dotted portion of the piece 18 is vertical. Journaled in the cross pieces 17 is the horizontally extending screw 19 on which is mounted a nut 20 which bears against one of the plates 22 whereby the emery wheel 21 is clamped between two bars or plates 22 so that it cannot turn or so that it can turn only slightly in proportion to the movement of the knives 13, the knives 13 being in sliding contact with the face of the wheel 21 during the sharpening operation, since the wheel may be adjusted to the exact position by adjusting the screw 16. The plates 22 are clamped against the sides of the wheel 21 by means of a bolt such as 23 having a nut thereon and the upper ends of the plates 22 are slotted as shown at 24 in Fig. III, the slots 24 receiving a horizontal longitudinal bar 25 carried by the frame 1 and forming a part thereof, whereby the rotation of the plates 22 is prevented but the plates and wheel are permitted to move longitudinally according to the movement of the screw 19. The screw 19 is adjusted by means of a crank 26 at one end thereof and the screws 16 are adjusted by means of a crank 27 at the top thereof, the handles on the crank 27 being connected by a link 28 so that the two cranks 27 necessarily move together and the two ends of the bar 19 consequently are always maintained at the same level.

At the left end of the shaft 8 as viewed in Fig. I is a second wheel 29 which is similar to the wheel 10 and on which runs a belt 30, the belt 30 driving a small wheel 31 at the end of a shaft 32 journaled at the left end of the frame 1 as viewed in Fig. I. The other end of the shaft 32, namely the left hand end carries a grinding wheel 33 for the purpose of grinding the shear blade of the lawn mower, the same being removed at the time the mower is placed on the block 3. Now it is necessary to grind two faces of the shear blade such as 34 in order to satisfactorily sharpen the same and I have provided means whereby this can be done on the single wheel 33. For grinding the bevel edge of the shear blade 34 I provide a cable plate 35 mounted at a slight inclination to the horizontal corresponding to the bevel on the shear blade 34, the plate 35 being carried by projecting arms 36 fixed to and integral with a plate 37 carried by the frame 1. Mounted on the plate 35 are two springs 38 bent into the form of a loop as shown in Fig. I. One end of each spring is hooked over so as to engage the edge of the plate 35 to hold the spring thereon while permitting the spring to be slid along lengthwise of the plate 35 and the other end of each spring, when the blade is not engaged thereby, fastens against the side of the spring near the hook portion just mentioned so as to complete the large loop. However, by holding up the last mentioned end of the spring, the knife 34 can be inserted thereunder and upon releasing the springs the blade will be held in the position shown in Fig. I and can be adjusted so that its beveled edge contacts with the wheel 33 in position for grinding the same. When the wheel is running, the springs can be slid along the plate 35 carrying the knife 34 with them and causing the wheel 33 to act upon the entire edge of the knife.

For grinding the flat face of the knife by means of the wheel 33 I provide two vertical slidable bars such as 39, the bars 39 being slidable on rods such as 40 carried by frame 41 fastened to the frame 1 by means of screws such as 42—42. Each of the vertical bars 39 carries a spring 43 similar to the springs 38 except that they are not provided with the hooked end but are fastened to the bars 39 by suitable screws or the like. As clearly shown in Fig. I the springs 43 form loops which may be sprung open to insert the knife 34 in position for grinding the under-face thereof against the wheel 33 and upon releasing the springs 43 the knife is clamped into position. Whereupon by sliding the bars 39, the wheel 33 is caused to act upon the entire length of the knife 34.

Having thus described my invention what I claim is:—

1. An apparatus for sharpening lawn mowers comprising a frame, a grinding stone positioned in the upper part thereof, a bed for the lawn mower, below the grinding stone, and means comprising a strap adapted to engage the handle bar of said mower and a hook engaging the front end thereof whereby to retain the said lawn mower in applied position.

2. In an apparatus for grinding lawn mowers, means for running the revoluble blades of the mower backward, a screw arranged parallel to the position of the mower when being sharpened, a nut on said screw, a grinding stone carried by said nut, a pair of plates carried by said nut, one on each side of said stone, means for adjusting the tension of said plates against said stone, means for preventing the rotation of said plates, and a frame in which said screw is mounted, means whereby said screw may be turned, and means whereby said frame may be adjusted vertically.

In testimony whereof I hereto affix my signature.

ALFRED F. WASHBURN.

Copies of this patent may be obtained for five cents each, by addressing the "Commissioner of Patents, Washington, D. C."